(12) United States Patent
Saitou

(10) Patent No.: US 9,582,448 B2
(45) Date of Patent: Feb. 28, 2017

(54) TRANSMISSION APPARATUS AND CONTROL UNIT

(71) Applicant: FUJITSU LIMITED, Kawasaki-shi, Kanagawa (JP)

(72) Inventor: Masahiro Saitou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/582,151

(22) Filed: Dec. 23, 2014

(65) Prior Publication Data

US 2015/0227430 A1  Aug. 13, 2015

(30) Foreign Application Priority Data

Feb. 13, 2014  (JP) .................................. 2014-025505

(51) Int. Cl.
 *G06F 11/14* (2006.01)
 *G06F 13/40* (2006.01)
 *G06F 1/24* (2006.01)

(52) U.S. Cl.
 CPC ............ *G06F 13/4022* (2013.01); *G06F 1/24* (2013.01)

(58) Field of Classification Search
 CPC ...... H04L 45/22; H04L 45/28; G06F 13/4027; G06F 13/4221; G06F 2213/0026; G06F 11/1441; G06F 9/4403; G06F 13/4022; G06F 1/24; G06F 1/3209
 See application file for complete search history.

(56) References Cited

U.S. PATENT DOCUMENTS

| | | | | |
|---|---|---|---|---|
| 8,041,995 B2* | 10/2011 | Abe | .................. | G06F 11/1658 714/23 |
| 8,255,725 B2* | 8/2012 | Shimazaki | ............ | G06F 1/3203 713/320 |
| 9,081,909 B2* | 7/2015 | Chu | ...................... | G06F 13/385 |
| 2006/0150024 A1* | 7/2006 | Abe | .................. | G06F 11/1658 714/38.14 |
| 2013/0145071 A1* | 6/2013 | Chu | ...................... | G06F 13/385 710/313 |
| 2016/0062424 A1* | 3/2016 | Thomas | .................. | G06F 1/24 710/313 |

FOREIGN PATENT DOCUMENTS

| | | |
|---|---|---|
| JP | 2000-259507 | 9/2000 |
| JP | 2005-122337 | 5/2005 |

\* cited by examiner

*Primary Examiner* — Nadeem Iqbal
(74) *Attorney, Agent, or Firm* — Fujitsu Patent Center

(57) ABSTRACT

A transmission apparatus includes a processor, a bridge connected to the processor, a device that is connected to the bridge but is not connected to a reset signal output terminal of the bridge, and a controller that controls resetting of the device according to a kind of reset for the processor.

8 Claims, 13 Drawing Sheets

TRANSMISSION APPARATUS AND CONTROL UNIT

CROSS-REFERENCE TO RELATED APPLICATION

This application is based upon and claims the benefit of priority of the prior Japanese Patent Application No. 2014-025505, filed on Feb. 13, 2014, the entire contents of which are incorporated herein by reference.

FIELD

The embodiment(s) discussed herein is related to a transmission apparatus and a control unit.

BACKGROUND

A peripheral component interconnect (PCI) bus system is known as disclosed in JP 2005-122337 A and JP 2000-259507 A, for example.

JP 2005-122337 A and JP 2000-259507 A discloses, for example, bus systems which include a plurality of devices and a bridge (a host bridge or a bus bridge) connected to a CPU, and the devices and the bridge are connected to a PCI bus.

For example, JP 2005-122337 A discloses that, when an abnormality occurs in any one of the plurality of devices, the host bridge rapidly restarts the device in the abnormal state while suppressing an influence thereof on the other normal devices as much as possible.

Meanwhile, JP 2000-259507 A discloses that a dedicated reset signal line is provided between the bus bridge and each of the plurality of devices and that the bus bridge selectively applies a reset signal to the plurality of devices.

However, both of JP 2005-122337 A and JP 2000-259507 A fail to disclose an operation performed in a case where a link between the CPU and the bridge is down according to a restart of the CPU.

SUMMARY

One aspect of a transmission apparatus may include: a processing unit configured to process a transmission signal transmitted in a network; and a control unit configured to control the processing unit. The control unit may include: a processor; a bridge connected to the processor; a device connected to the bridge and unconnected to a reset signal output terminal of the bridge; and a controller configured to control a reset of the device according to a kind of a reset for the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
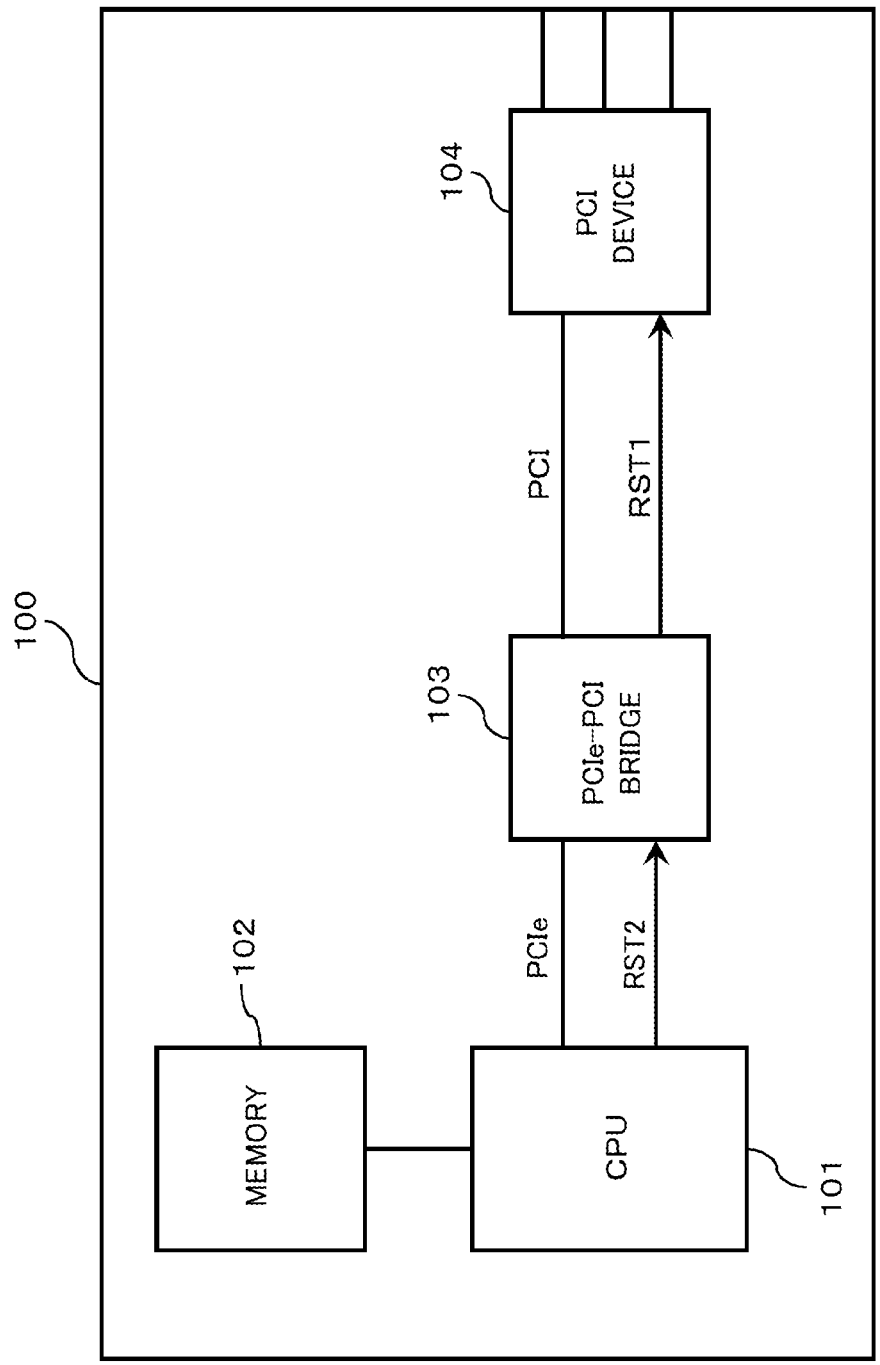
FIG. 1 is a block diagram that illustrates an exemplary configuration of a processing card using a PCIe-PCI bridge.

Hereinafter, embodiments will be described with reference to the drawings. However, the embodiments described below are merely examples but are not for the purpose of excluding various modified examples or the application of various technologies that are not explicitly described below. In the drawings used in the following embodiments, the same or similar components are denoted by the same reference numerals unless otherwise mentioned.

According to the technological advance, a connection used between devices has shifted from a parallel interface to a serial interface. However, the timing of the shifting differs depending on each device vendor, and the shifting is not always made in the same period.

For example, it may be considered that a product in which a CPU and a PCI device connected with a PCI are built in. It is assumed that a CPU vendor releases a CPU which supports the PCI express (hereinafter, referred to as the "PCIe") but does not support the PCI.

In such a case, with considering the availability and the cost of a device, the product may be redesigned to be added a PCIe-PCI bridge even though the CPU is changed to (or replaced with) a CPU supporting the PCIe for the purpose of the continued use of the existing PCI device.

In the case, the operations of the product before and after the addition or the replacement of the component are requested to coincide with each other. In a case where the product is configured with general-purpose components such as LSIs, unlike a self-developed LSI, LSIs that comply with certain specifications may be combined to configure the product. Accordingly, a configuration enabling the above-described operations to coincide with each other may be required. For example, an additional hardware installation, a differential absorption using software, or a combination thereof may be applicable to the above configuration.

A reset process for a PCI device is one of differences between a connection with the PCI and a connection via a PCIe-PCI bridge. There are several conditions for the PCIe-PCI bridge to output a reset signal. A link-down of the PCIe is one of the conditions.

When the link-down of the PCIe occurs, the PCIe-PCI bridge asserts a PCI reset signal output to thereby reset the PCI device. The reset process to reset a PCI device in response to a detection of the link-down of the PCIe is specified in Section 7.1.3 of a reference document of "PCI Express (trademark) to PCI/PCI-X Bridge Specification Revision 1.0 (Jul. 14, 2013)".

In the reference document, a PCIe connected to a PCIe-PCI bridge corresponds to a "primary interface", and a PCI device connected to the PCIe-PCI bridge corresponds to a "secondary interface".

Here, the PCIe link-down may occur not only when a fault of the PCIe and the like but also when a restart of a CPU connected to the PCIe. Accordingly, a reset signal is input to the PCI device in response to the restart of the CPU.

When the reset signal is input to the PCI device, the process of the PCI device is stopped until the PCI device is reset. Accordingly, in a case where the PCI device is responsible for a significant process of a system, services provided by the system are stopped.

FIG. 1 illustrates an exemplary configuration of a processing card using a PCIe-PCI bridge. Here, the "card" may be referred to as a "board" or may be referred to as a "device" or a "unit". In addition, as illustrated in FIG. 1, the configuration using the PCIe-PCI bridge may be referred to as a "bridge configuration".

The processing card 100 illustrated in FIG. 1 includes, for example, a CPU 101, a memory 102, a PCIe-PCI bridge (LSI) 103, and a PCI device 104.

The PCIe-PCI bridge (hereinafter, it may be simply referred to as a "bridge") 103 is connected to the CPU 101 through a PCIe bus and is connected to the PCI device 104 through a PCI bus.

Further, between the CPU 101 and the bridge 103, a reset signal line used to input a reset signal RST2 from the CPU 101 to the bridge 103 is provided. Meanwhile, between the bridge 103 and the PCI device 104, a reset signal line used to input a reset signal RST1 from the bridge 103 to the PCI device 104 is provided.

With such a configuration, in response to a detection of a link-down of the PCIe bus, the bridge 103 asserts a reset signal RST1 to input the reset signal RST1 to the PCI device 104. Thereby, the PCI device is reset. Thereafter, the bridge 103 performs a self-reset.

When the PCI device 104 is reset but the bridge 103 is not reset, the CPU 101 controls a value stored in a register (not illustrated) installed in the bridge 103 to thereby assert a reset signal RST1.

The reset of the bridge 103 is performed in response to an assertion of a reset signal RST2 from the CPU 101, a control of a value of a register installed in the CPU 101, a link-down of the PCIe bus, or the like. In any of the cases, the reset signal RST1 is asserted, and accordingly, the PCI device 104 is reset.

Figure 2:
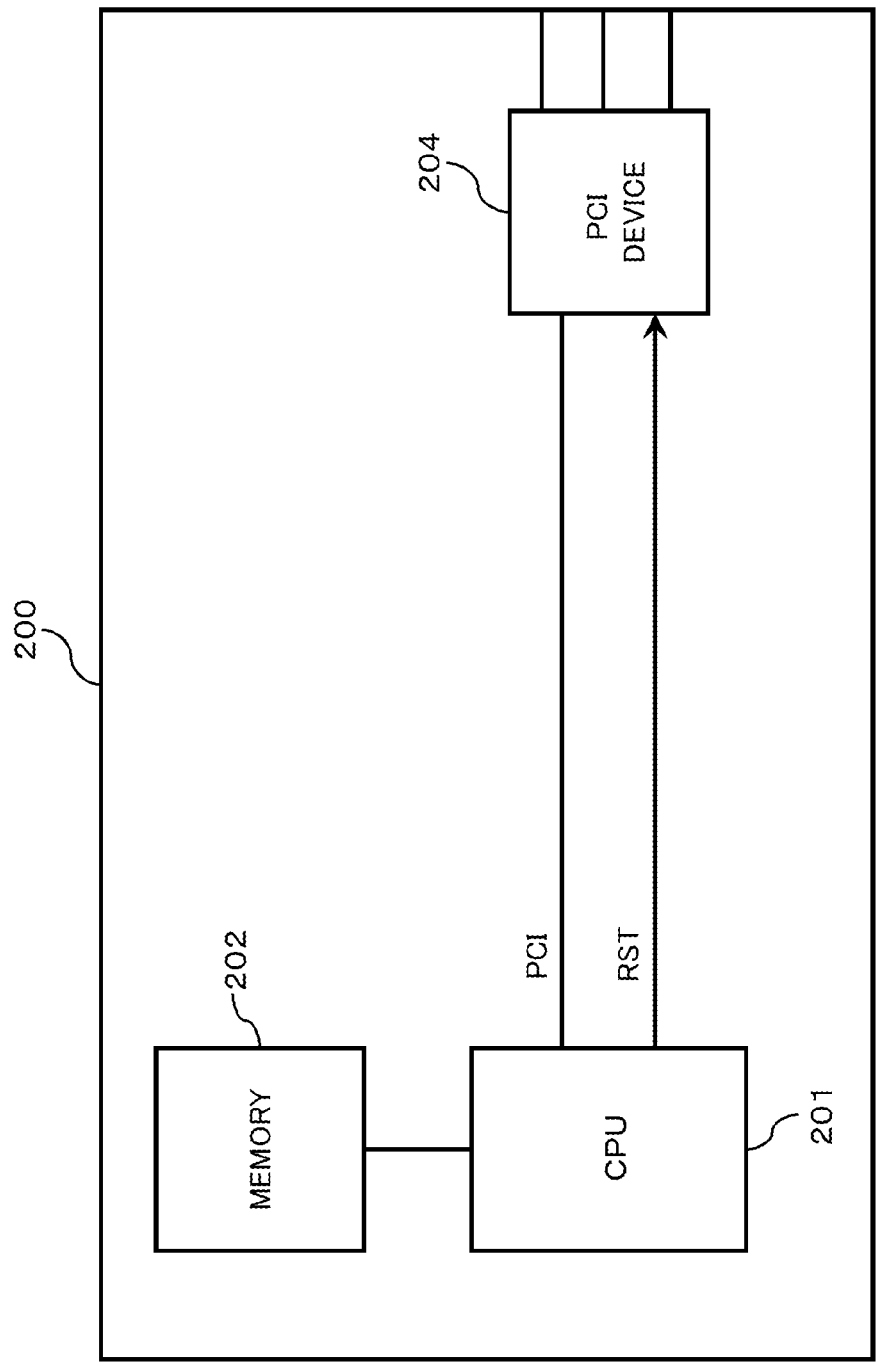
FIG. 2 is a block diagram that illustrates an exemplary configuration of a processing card in which a CPU and a PCI device are connected using a PCI.

Meanwhile, in the configuration including the CPU and the PCI device that are connected using the PCI, a restart of the CPU is not a direct factor which causes the PCI device to be reset. FIG. 2 illustrates an exemplary configuration of a processing card in which a CPU and a PCI device are connected using a PCI.

The processing card 200 illustrated in FIG. 2 includes, for example, a CPU 201, a memory 202, and a PCI device 204 that is connected to the CPU 201 with a PCI bus. Further, between the CPU 201 and the PCI device 204, a reset signal line used to input a reset signal RST from the CPU 201 to the PCI device 204 is provided.

In such a configuration, it depends on the design factor whether or not a restart of the CPU 201 is a reset factor of the PCI device 204. For example, in the case of a design in which a reset signal RST is asserted according to a reset of the CPU 201, the reset of the CPU 201 is a reset factor of the PCI device 204. Otherwise, the reset of the CPU 201 may be a non-reset factor of the PCI device 204.

Here, in the processing card 100 illustrated in FIG. 1, the PCI device 104 may be a device configured to process a signal transmitted through a communication network such as a synchronous digital hierarchy (SDH), a synchronous optical network (SONET), the Ethernet (registered trademark), or the like. Further, the PCI device 104 may be a device configured to perform a relay (or transfer) process of path setting information for a transmission signal, a device configured to perform a distribution process of clock signals, or the like.

In a case where the PCI device 104 corresponds to any one of such devices, when the CPU 101 is restarted for an update of software or the like for the processing card 100, a link-down of the PCIe bus is detected by the bridge 103.

In response to the detection of the link-down of the PCIe bus, the bridge 103 inputs a reset signal RST1 to the PCI device 104 to thereby reset the PCI device 104 according to the bridge specifications in the reference document described above.

Accordingly, until a resetting of the PCI device 104 is performed after the CPU 101 is restarted, the transmission apparatuses for the Ethernet, the SDH, and the SONET do not normally operate, and therefore, the communication service is stopped. An exemplary configuration of the transmission apparatus for the Ethernet or the SDH/SONET will be described later with reference to FIGS. 3 and 4.

Thus, this embodiment enables a processing card with the bridge configuration to prevent a PCI device connected to the bridge from being forcedly reset, even though the CPU is restarted. Further, in order to prevent the PCI device from not being reset when the resetting is necessary under the prevention of the forced reset described above, the reset control of the PCI device is available according to the operating state of the processing card.

Accordingly, for example, even though the restart of the CPU due to a software update or the like is performed for the processing card having the bridge configuration that is used for a transmission apparatus for the SDH/SONET or the Ethernet, it is able to prevent signal processing performed by the transmission apparatus from being influenced by the restart of the CPU.

Exemplary Configuration of Ethernet Transmission Apparatus

Figure 3:
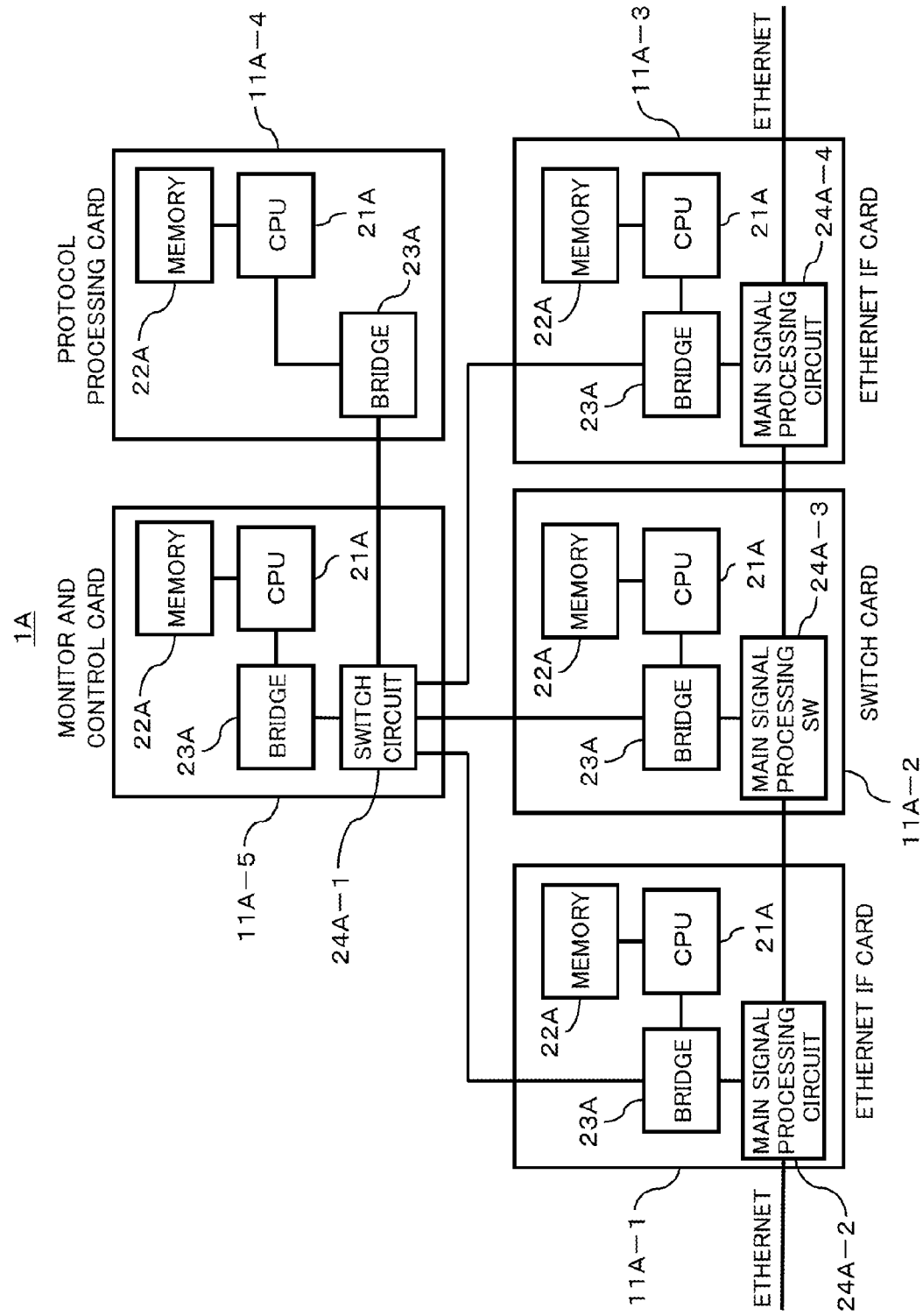
FIG. 3 is a block diagram that illustrates an exemplary configuration of an Ethernet transmission apparatus.

FIG. 3 is a block diagram that illustrates an exemplary configuration of an Ethernet transmission apparatus. The Ethernet transmission apparatus 1A illustrated in FIG. 3 is an example of a transmission apparatus having a rack-mount structure in which a plurality of processing cards can be mounted.

The Ethernet transmission apparatus 1A may include, for example, Ethernet interface cards 11A-1 and 11A-3, a switch card 11A-2, a protocol processing card 11A-4, and an apparatus monitor and control card 11A-5, as examples of the plurality of rack-mountable processing cards.

Each of the Ethernet interface cards 11A-1 and 11A-3 provides a communication interface that enables communication with the Ethernet. For example, each of the Ethernet interface cards 11A-1 and 11A-3 is operable to perform a transmission process to transmit an Ethernet frame signal to the Ethernet and to perform a reception process to receive an Ethernet frame signal from the Ethernet.

The switch card 11A-2 is connected to the Ethernet interface cards 11A-1 and 11A-3 and is operable to control (or switch) internal transmission paths of Ethernet frame signals transceived between the cards 11A-1 and 11A-3.

The protocol processing card 11A-4 is operable to perform a path setting, a monitor and the like on each of the Ethernet interface cards 11A-1 and 11A-3 and the switch card 11A-2 in cooperation with the apparatus monitor and control card 11A-5.

The apparatus monitor and control card 11A-5 is operable to monitor and control the overall operation of the Ethernet transmission apparatus 1A.

Each of the above-described cards 11A-1 to 11A-5, for example, has a bridge configuration and includes a CPU 21A and a memory 22A that are used for the execution of software (or a program) to realize the function thereof. The CPU 21A is an example of a processor having a calculation capability and is, for example, an example of a CPU that supports the PCIe but not the PCI.

Since the CPU 21A does not support the PCI, each of the cards 11A-1 to 11A-5 includes a PCIe-PCI bridge 23A so as to enable the use of a PCI device. For example, the bridge 23A may be configured by using an LSI.

The bridge 23A is connected to the CPU 21A through the PCIe bus and is connected to the PCI device through the PCI bus. Each of the cards 11A-1 to 11A-5 may include a device according to the function provided thereby as a PCI device connected to the PCIe-PCI bridge 23A. The number of PCI devices included in each of the cards 11A-1 to 11A-5 may be one or more.

For example, the Ethernet interface cards 11A-1 and 11A-3 respectively include main signal processing circuits 24A-2 and 24A-4 used for processing Ethernet frame signals corresponding to main signals as examples of the PCI device connected to the PCIe-PCI bridge 23A. Each of the main signal processing circuits 24A-2 and 24A-4 may be configured by using an LSI.

Further, the switch card 11A-2 may include a main signal processing switch (SW) 24A-3 operable to switch the main signals as an example of the PCI device connected to the PCIe-PCI bridge 23A.

Furthermore, the apparatus monitor and control card 11A-5 may include a switch circuit 24A-1 as an example of the PCI device connected to the PCIe-PCI bridge 23A. The switch circuit 24A-1 may be configured by using an LSI. The switch circuit 24A-1 is connected to the PCIe-PCI bridges 23A of the other cards 11A-1 to 11A-4 so as to enable inter-card communication among the cards 11A-1 to 11A-5. Ethernet or the like is applicable to a protocol of the inter-card communication. The switch circuit 24A-1 is an example of the PCI device that is connected to the PCIe-PCI bridge 23A of the protocol processing card 11A-4.

An example of the inter-card communication among the cards 11A-1 to 11A-5 is as follows.

For example, the apparatus monitor and control card 11A-5 is operable to transmit data used for updating the software to the other cards 11A-1 to 11A-4.

Further, the protocol processing card 11A-4 is operable to transmit the path setting information to the Ethernet interface cards 11A-1 and 11A-3 and the switch card 11A-2.

Furthermore, the Ethernet interface cards 11A-1 and 11A-3 and the switch card 11A-2 are operable to transmit data (for example, error information of a port and the like) used for generating the path setting information to the protocol processing card 11A-4.

Further, each of the cards 11A-1 to 11A-4 other than the apparatus monitor and control card 11A-5 is operable to transmit information (for example, failure information or the like) indicative of the state of the card to the apparatus monitor and control card 11A-5.

During the operation of the Ethernet transmission apparatus 1A having the configuration as described above, for example, it is assumed that the CPU 21A is restarted so as to update the software of the apparatus monitor and control card 11A-5. In such a case, according to the specifications of the PCIe described above, since the PCIe-PCI bridge 23A detects a link-down of the PCIe due to the restart of the CPU 21A, the PCIe-PCI bridge 23A resets the switch circuit 24A-1. As a result, since the switch circuit 24A-1 which relays (or transfers) the inter-card communication among the cards 11A-1 to 11A-5 does not normally work, the inter-card communication among the cards 11A-1 to 11A-5 becomes unavailable Therefore, the maintenance of path information (or routing information) and the like is unavailable.

Exemplary Configuration of SONET Transmission Apparatus

Figure 4:
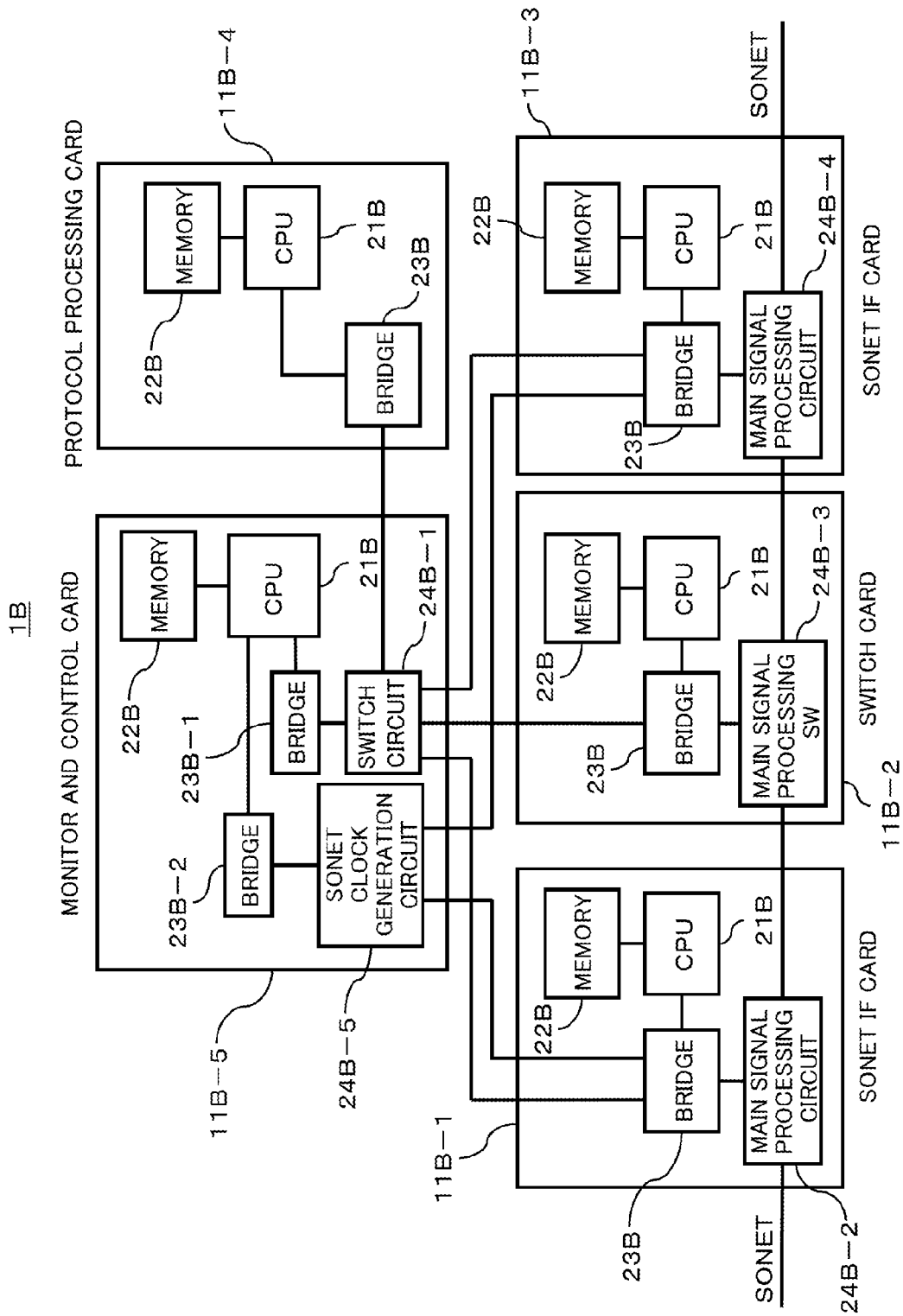
FIG. 4 is a block diagram that illustrates an exemplary configuration of a SONET transmission apparatus.

FIG. 4 is a block diagram that illustrates an exemplary configuration of a SONET transmission apparatus. The SONET transmission apparatus 1B illustrated in FIG. 4 is an example of a transmission apparatus having a rack-mount structure in which a plurality of processing cards can be mounted and has a configuration similar to the Ethernet transmission apparatus 1A illustrated in FIG. 3.

For example, the SONET transmission apparatus 1B may include SONET interface cards 11B-1 and 11B-3, a switch card 11B-2, a protocol processing card 11B-4, and an apparatus monitor and control card 11B-5, as examples of a plurality of rack-mountable processing cards.

Each of the SONET interface cards 11B-1 and 11B-3 provides a communication interface that enables communication with the SONET. For example, each of the SONET interface cards 11B-1 and 11B-3 is operable to perform a transmission process to transmit a synchronization frame signal to the SONET and to perform a reception process to receive a synchronization frame signal from the SONET.

The switch card 11B-2 is connected to both of the SONET interface cards 11B-1 and 11B-3 and is operable to control (or switch) internal transmission paths of synchronization frame signals transceived between the switch cards 11B-1 and 11B-3.

The protocol processing card 11B-4 is operable to perform a path setting, a monitor and the like on each of the SONET interface cards 11B-1 and 11B-3 and the switch card 11B-2 in cooperation with the apparatus monitor and control card 11B-5.

The apparatus monitoring/control card 11B-5 monitors and controls the overall operation of the SONET transmission apparatus 1B.

Each of the above-described cards 11B-1 to 11B-5, for example, has a bridge configuration and may include a CPU 21B and a memory 22B that are used for the execution of software (or a program) to realize the function thereof. The CPU 21B is an example of a processor having a calculation capability and, for example, is an example of a CPU that supports the PCIe but not the PCI.

Since the CPU 21B does not support the PCI, each of the cards 11B-1 to 11B-4 may include a PCIe-PCI bridge 23B so as to enable the use of a PCI device. The apparatus monitor and control card 11B-5 may include, for example, a plurality of bridges 23B-1 and 23B-2 corresponding to a plurality of (for example, two) PCI devices. When the bridges 23B-1 and 23B-2 do not need to be distinguished from each other, one of them may be simply referred to as a "PCIe-PCI bridge 23B". For example, each bridge 23B may be configured by using an LSI.

The PCIe-PCI bridge 23B is connected to the CPU 21B through the PCIe bus and is connected to the PCI device through the PCI bus. Each of the cards 11B-1 to 11B-5 may include a device according to the function provided thereby as a PCI device connected to the PCIe-PCI bridge 23B.

For example, the SONET interface cards 11B-1 and 11B-3 may respectively include main signal processing circuits 24B-2 and 24B-4 used for processing synchronization frame signals corresponding to main signals, as examples of the PCI device connected to the PCIe-PCI bridge 23B. Each of the main signal processing circuits 24B-2 and 24B-4 may be configured by using an LSI.

The switch card 11B-2 may include a main signal processing switch (SW) 24B-3 operable to perform switching of the main signals, as an example of the PCI device connected to the PCIe-PCI bridge 23B.

The apparatus monitor and control card 11B-5 may include a switch circuit 24B-1 and a SONET clock generation circuit 24B-5 as examples of the PCI device connected to the PCIe-PCI bridge 23B. Each of the switch circuit 24B-1 and the SONET clock generation circuit 24B-5 may be configured by using an LSI.

The switch circuit 24B-1 is connected to the PCIe-PCI bridges 23B of the other cards 11B-1 to 11B-4 so as to enable inter-card communication among the cards 11B-1 to 11B-5. Ethernet or the like is applicable to a protocol of the inter-card communication. The switch circuit 24B-1 is also an example of the PCI device connected to the PCIe-PCI bridge 23B of the protocol processing card 11B-4.

The SONET clock generation circuit 24B-5 is connected to the PCIe-PCI bridges 23B of the SONET interface cards 11B-1 and 11B-3 and is operable to supply (or distribute) clock signals used for processing synchronization frame signals in the main signal processing circuits 24B-2 and 24B-4, for example.

An example of the inter-card communication among the cards 11B-1 to 11B-5 is as follows.

For example, the apparatus monitor and control card 11B-5 is operable to transmit data used for updating the software to the other cards 11B-1 to 11B-4.

The protocol processing card 11B-4 is operable to transmit the path setting information to the SONET interface cards 11B-1 and 11B-3 and the switch card 11B-2.

The SONET interface cards 11B-1 and 11B-3 and the switch card 11B-2 are operable to transmit data (for example, error information of a port and the like) used for generating the path setting information to the protocol processing card 11B-4.

Each of the cards 11B-1 to 11B-4 other than the apparatus monitor and control card 11B-5 are operable to transmit information (for example, failure information or the like) indicative of the state of the card to the apparatus monitor and control card 11B-5.

During the operation of the SONET transmission apparatus 1B having the configuration as described above, for example, it is assumed that the CPU 21B is restarted so as to update the software of the apparatus monitor and control card 11B-5. In such a case, according to the specifications of the PCIe described above, since the bridges 23B-1 and 23B-2 detect a link-down of the PCIe in response to the restart of the CPU 21B, the bridges 23B-1 and 23B-2 respectively reset the switch circuit 24B-1 and the SONET clock generation circuit 24B-5.

As a result, since the switch circuit 24B-1 that relays (or transfers) the inter-card communication among the cards 11B-1 to 11B-5 does not normally work, the inter-card communication among the cards 11B-1 to 11B-5 becomes unavailable, Therefore, the maintenance of the path information and the like is unavailable. Also, since the SONET clock generation circuit 24B-5 that supplies the clock signals to the SONET interface cards 11B-1 and 11B-2 does not normally work, the supply of the clock signals to the main signal processing circuits 24B-1 and 24B-4 becomes unavailable. Accordingly, the processing of the main signals is not normally work, and the communication service of the SONET is stopped.

As explained above, in a case where the bridge configuration is employed by the cards 11A-1 to 11A-5 and 11B-1 to 11B-5 mounted in the transmission apparatuses 1A and 1B illustrated in FIGS. 3 and 4, the processing of the main signal may be influenced by the reset of the PCI device compatible to the bridge specifications of the PCIe.

Figure 5:
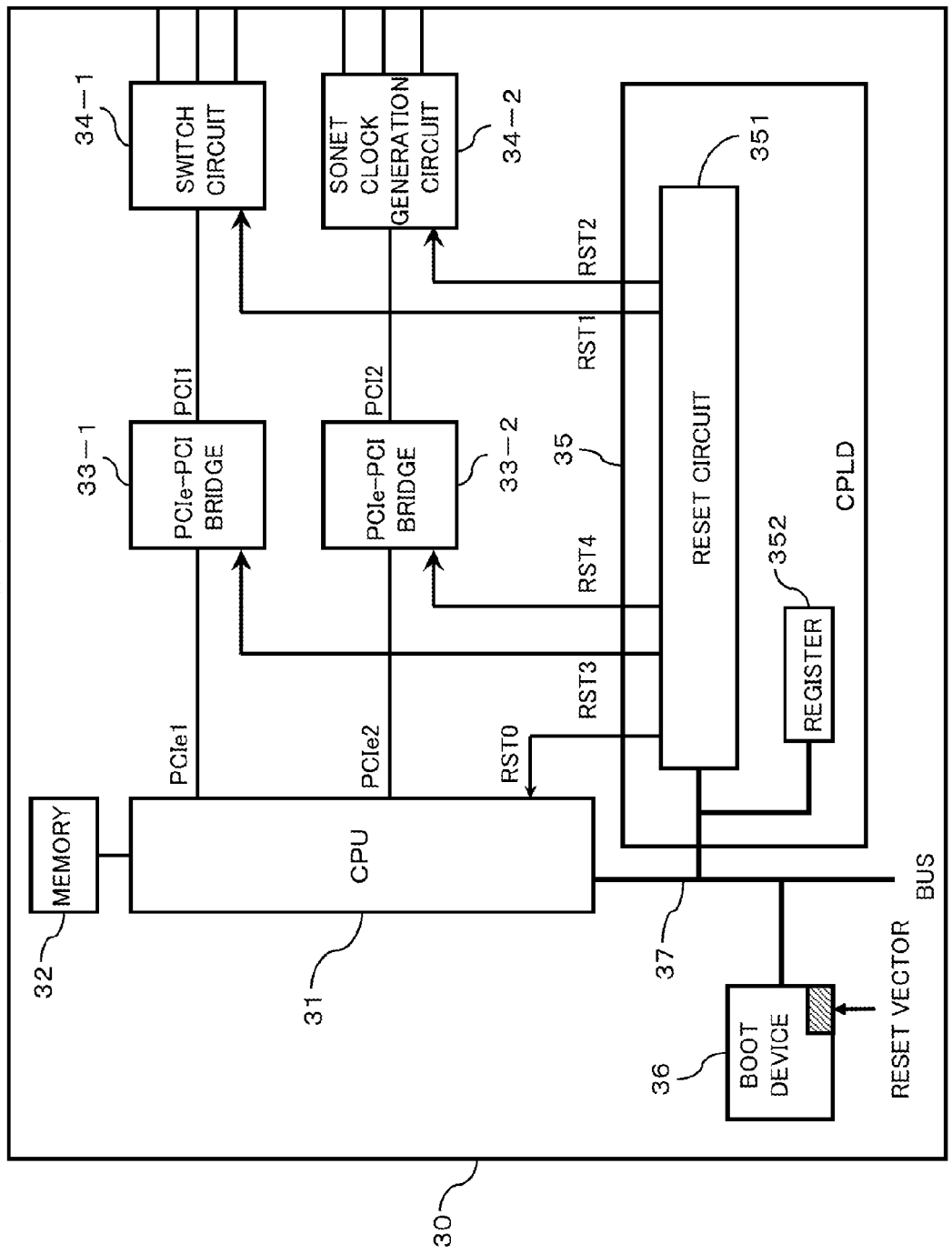
FIG. 5 is a block diagram that illustrates an exemplary configuration of a processing card installed in the SONET transmission apparatus illustrated in FIG. 4.

Thus, in this embodiment, the bridge configuration illustrated in FIG. 5 is employed as an exemplary configuration of the cards mounted in the transmission apparatuses 1A and 1B. FIG. 5 is a block diagram that illustrates an exemplary configuration of the processing card 30 mounted in the SONET transmission apparatus 1B. The processing card 30 corresponds to, for example, the apparatus monitor and control card 11B-5 illustrated in FIG. 4.

The processing card 30 illustrated in FIG. 5 may include a CPU 31, a memory 32, PCIe-PCI bridges 33-1 and 33-2, a switch circuit 34-1, a SONET clock generation circuit 34-2, a reset control circuit 35, and a boot device 36. The CPU 31, the reset control circuit 35, and the boot device 36 may be communicably connected each other through a bus 37, for example.

A complex programmable logic device (CPLD) is applicable to the reset control circuit 35. The CPLD is an example of a device of which an internal operation is changeable according to specification determined by a user. The reset control circuit 35 using the CPLD may be referred to as a unit control and monitor CPLD 35.

In relation with the configuration illustrated in FIG. 4, the CPU 31 corresponds to the CPU 21B that is an example of a processor, the memory 32 corresponds to the memory 22B, and the bridges 33-1 and 33-2 respectively correspond to the bridges 23B-1 and 23B-2. Further, the switch circuit 34-1 and the SONET clock generation circuit 34-2 that are examples of the PCI device respectively correspond to the switch circuit 24B-1 and the SONET clock generation circuit 24B-5. In a case where the bridges 33-1 and 33-2 do not need to be distinguished from each other, they may be referred to as a "bridge 33". Similarly, in a case where the PCI devices 34-1 and 34-2 do not need to be distinguished from each other, they may be referred to as a "PCI device 34".

The bridge 33-1 is connected to the CPU 31 through a PCIe bus PCIe1 and is connected to the switch circuit 34-1 that is an example of the PCI device through a PCI bus PCI1. Similarly, the bridge 33-2 is connected to the CPU 31 through a PCIe bus PCIe2 and is connected to the SONET clock generation circuit 34-2 that is an example of the PCI device through a PCI bus PCI2.

The CPLD 35 is an example of a circuit operable to individually and selectively control the reset of the CPU 31, the bridges 33-1 and 33-2, the switch circuit 34-1, and the SONET clock generation circuit 34-2.

For example, the CPLD 35 may include a reset circuit 351 and a register 352 that are connected to the bus 37. A reset signal can be individually and selectably given to the CPU 31, the bridges 33-1 and 33-2, the switch circuit 34-1, and the SONET clock generation circuit 34-2 from the reset circuit 351.

For example, when the CPU 31 is reset, the reset circuit 351 is operable to assert a reset signal RST0 and to input the reset signal RST0 to a reset signal input terminal (not illustrated) provided for the CPU 31. For example, the reset of the CPU 31 may be performed when the CPU 31 is restarted in a state where power is supplied to the processing card 30.

Meanwhile, when the switch circuit 34-1 is reset, the reset circuit 351 is operable to assert a reset signal RST1 and to input the reset signal RST1 to a reset signal input terminal (not illustrated) provided for the switch circuit 34-1.

Similarly, when the SONET clock generation circuit 34-2 is reset, the reset circuit 351 is operable to assert a reset signal RST2 and to input the reset signal RST2 to a reset signal input terminal (not illustrated) provided for the SONET clock generation circuit 34-2.

In other words, each of the resets of the switch circuit 34-1 and the SONET clock generation circuit 34-2 is controlled by the reset circuit 351 that is provided separately from the bridges 33-1 and 33-2. Further, in other words, reset signal output terminals provided for the PCI bus PCI1 and PCI2 sides of the bridges 33-1 and 33-2 are unconnected to reset signal input terminals provided for the PCI devices 34-1 and 34-2.

Accordingly, even though a link-down of the PCIe bus PCIe1 is detected by the bridge 33-1 due to the restart of the CPU 31 and a reset signal is asserted by the bridge 33-1, the reset signal is not input to the PCI device 34-1.

Similarly, even though a link-down of the PCIe bus PCIe2 is detected by the bridge 33-2 due to the restart of the CPU 31 and a reset signal is asserted by the bridge 33-2, the reset signal is not input to the PCI device 34-2.

In other words, a reset signal line is not provided between the bridge 33 and the PCI device 34 but a reset signal line is provided between the reset circuit 351 of the unit control/ monitoring CPLD 35 and the PCI device 34 instead.

Accordingly, the PCI device 34 is not reset by the bridge 33 but is alternatively reset by the reset circuit 351 in response to whether or not the reset of the PCI device 34 is necessary.

Further, when the bridge 33 is reset, the reset circuit 351 is operable to assert a reset signal RST3 or RST4 and to input the reset signal RST3 or RST4 to a reset signal input terminal (not illustrated) of the bridge 33.

Here, reset signal lines through which the aforementioned reset signals RST0 to RST4 are transmitted may be respectively denoted by reset signal lines RST0 to RST4.

The register 352 is an example of a storage unit and may hold information indicative of the operating state of the processing card 30. The information held in the register 352 can be referred to by the CPU 31 through the bus 37. The process of the software can be changed by software executed in the CPU 31 which refers to the information held in the register 352, for example.

For example, the register 352 holds a default value (it may be referred to as an initial value; for example, "0") when the processing card 30 is powered on, and thereafter, the default value may be changed by the software. For example, when the software performs a setting of the PCI device 34, the value in the register 352 is changed (or updated) to a value (for example, "1") indicative of a state where the setting has already been performed. The software can determine whether or not the setting of the PCI device 34 is necessary with reference to the value of the register 352.

For example, when the value held in the register 352 is the default value, the software may determine that the processing card 30 is powered on and may perform the setting on the PCI device 34.

On the other hand, when the CPU 31 is restarted in a state after the processing card 30 is powered on, the setting of the PCI device 34 has already been performed and the value of the register 352 has been changed from the default value. Accordingly, the software may determine that the resetting of the PCI device 34 is not necessary and may inhibit to reset the PCI device 34.

In other words, the register value held in the register 352 is an example of information indicative of the kind of reset of the CPU 31. In other words, the register value is an example of flag information indicative of a reset performed in response to a power-on reset of the processing card 30 or a reset performed in response to a restart of the CPU 31 after the CPU 31 is powered on. Accordingly, the unit control and monitor CPLD 35 may be considered as an example of a controller operable to control the reset of the PCI device 34 according to the kind of the reset of the CPU 31.

In this way, the resetting of the PCI device 34 is inhibited when the CPU 31 is restarted, the operating state of the PCI device 34 is not changed.

Accordingly, for example, even though the CPU 31 is restarted due to an software update of the processing card 30, the PCI device 34 is able to continue its operation normally without being subjected to the influence of the software update.

Accordingly, for example, it is possible to normally continue a process of transferring the path information (or routing information) for the SONET, which is performed by the switch circuit 34-1, a process of distributing the clock signals, which is performed by the SONET clock generation circuit 34-2, and the like.

The boot device 36 illustrated in FIG. 5 may store software (may be referred to as a boot program) that is referred to and executed by the CPU 31 in response to a power-on reset of the processing card 30 or a reset of the CPU 31. Here, the address at which the boot program is stored may be referred to as a "reset vector".

Operation Example

Next, an exemplary operation of the processing card 30 will be described with reference to FIGS. 6 to 8.

Figure 6:
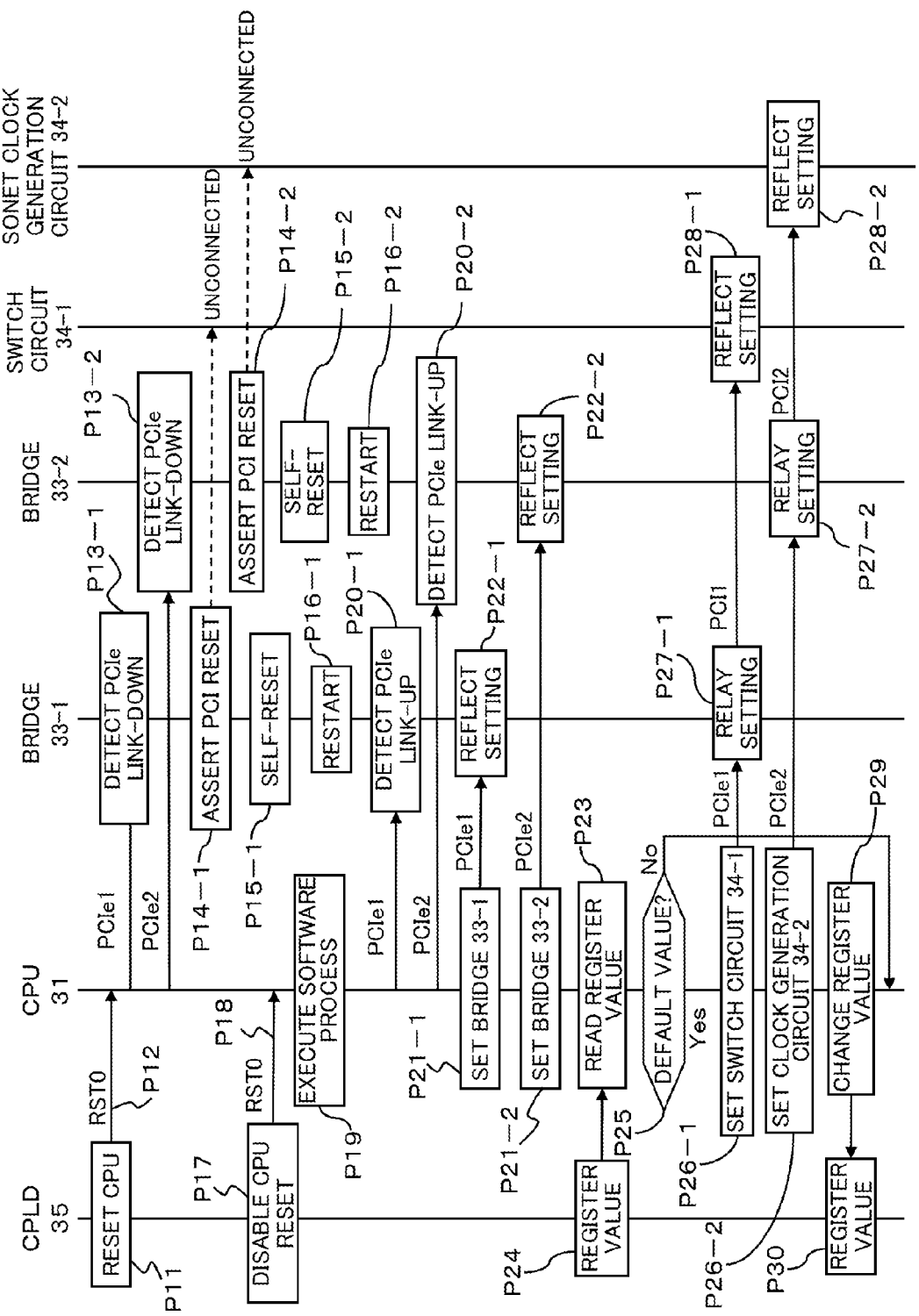
FIGS. 6 to 8 are sequence diagrams that illustrate exemplary operations of the processing card illustrated in FIG. 5.

First, FIG. 6 is a flowchart that illustrates an exemplary operation performed in response to a restart of the CPU 31 in a state where the processing card 30 is powered on.

In response to an assertion of a reset signal RST0 output by the reset circuit 351 of the CPLD 35, the reset signal RST0 is input to the CPU (Processes P11 and P12).

In response to an input of the reset signal RST0 to the CPU 31, a reset signal is input to a PCIe controller (not illustrated) built in the CPU 31, and thereby, links of the PCIe buses PCIe1 and PCIe2 are down.

Then, the link-downs of the PCIe buses PCIe1 and PCIe2 are respectively detected by the bridges 33-1 and 33-2 (Processes P13-1 and P13-2). In response to the detection of the link-downs, the bridges 33-1 and 33-2 respectively assert reset signals directed to the PCI devices 34-1 and 34-2 according to the aforementioned bridge specifications (Processes P14-1 and P14-2).

However, as described above, the reset signal output terminals of the bridges 33-1 and 33-2 directed to the PCI buses PCI1 and PCI2 are not connected to the PCI devices 34-1 and 34-2, and the reset signals are not input to the PCI devices 34-1 and 34-2. Accordingly, the operations of the PCI devices 34-1 and 34-2 are not influenced by the reset signals.

Thereafter, the bridges 33-1 and 33-2 autonomously reset (or self-reset) themselves respectively (Processes P15-1 and P15-2) and are restarted (Processes P16-1 and P16-2).

Meanwhile, the CPU 31 is restarted in response to a de-assertion (or disablement) of the reset signal RST0 output by the reset circuit 351 of the CPLD 35 (Processes P17 and P18). In response to the restart of the CPU 31, the CPU 31 starts a software process by referring to a reset vector of the boot device 36 to execute a boot program. With the software process, the CPU 31 performs, for example, a setting on a built-in PCIe controller used for controlling a peripheral device (Process P19).

In response to the setting of the PCIe controller, the bridges 33-1 and 33-2 respectively detect link-ups of the PCIe buses PCIe1 and PCIe2 (Processes P20-1 and P20-2). Thereby, the CPU 31 is possible to access internal registers (not illustrated) of the bridges 33-1 and 33-2 through the PCIe buses PCIe1 and PCIe2.

The CPU 31 respectively transmits setting information for the bridges 33-1 and 33-2 to the bridges 33-1 and 33-2 through the PCIe buses PCIe1 and PCIe2 (Processes P21-1 and P21-2). The bridges 33-1 and 33-2 respectively store and reflect the setting information received from the PCIe buses PCIe1 and PCIe2 in the internal registers (Processes P22-1 and P22-2). Thereby, the bridges 33-1 and 33-2 are possible to relay the settings for the PCI devices 34-1 and 34-2.

The CPU 31 reads the value (hereinafter, may be referred to as a "register value") held in the register 352 of the CPLD 35 (Processes P23 and P24) and checks whether or not the read value is the default value (for example, "0") (Process P25).

As a result of the checking process, when the read register value is the default value (Yes in Process P25), the CPU 31 may determine the checking result indicating a state where the restart of the CPU 31 is caused in response to the input of power (or power-on reset) and a state where the setting of the PCI devices 34-1 and 34-2 are not still performed.

Accordingly, the CPU 31 performs the setting on the PCI devices 34-1 and 34-2.

For example, the CPU 31 transmits the setting information for the switch circuit 34-1 to the bridge 33-1 through the PCIe bus PCIe1, and the bridge 33-1 transfers (or relays) the received setting information to the switch circuit 34-1 through the PCI bus PCI1 (Processes P26-1 and P27-1). Upon receiving the setting information through the PCI bus PCI1, the switch circuit 34-1 stores and reflects the received setting information in an internal register (not illustrated) (Process P28-1).

Similarly, the CPU 31 transmits the setting information for the SONET clock generation circuit 34-2 to the bridge 33-2 through the PCIe bus PCIe2 (Process P26-2). The bridge 33-2 transfers (or relays) the received setting information to the SONET clock generation circuit through the PCI bus PCI2 (Process P27-2). Upon receiving the setting information through the PCI bus PCI2, the SONET clock generation circuit 34-2 stores and reflects the received setting information in an internal register (not illustrated) (Process P28-2).

The order of setting of the PCI devices 34-1 and 34-2 is exchangeable. For example, in FIG. 6, although the setting of the switch circuit 34-1 is performed before the setting of the SONET clock generation circuit 34-2, the execution order may be exchanged. Further, the setting of the PCI devices 34-1 and 34-2 may be performed in parallel.

In response to a completion of the setting of the PCI devices 34-1 and 34-2, the CPU 31 changes the register value held in the CPLD 35 from the default value to a value (for example, 1) indicative of the completion of the setting (Processes P29 and P30).

Accordingly, when the CPU 31 is restarted after the setting completion, for example, due to the update of the software for the processing card 30, the CPU 31 determines in Processes P23 to P25 that the read register value is not the default value (No route of Process P25).

Accordingly, resetting of the PCI device 34 is not performed. Thereby, even though the restart of the CPU 31 occurs in a state where the setting of the PCI device 34 has already been completed, it is possible to prevent the setting of the PCI device 34 from being overwritten and being changed.

Next, examples of the operation of the processing card 30 when the individual reset signal lines RST1 to RST4 illustrated in FIG. 5 are used will be described. The reset signal lines RST1 to RST4 may be used for resetting and restarting for the purpose of recovering any of errors listed below.

(1) an error due to a failure or the like occurs in one of the bridge 33 and the PCI device 34

(2) a communication error (an error in one of the PCIe buses PCIe1 and PCIe2) occurs between the CPU 31 and the bridge 33

(3) a communication error (an error in one of the PCI buses PCI1 and PCI2) occurs between the bridge 33 and the PCI device 34

Figure 7:
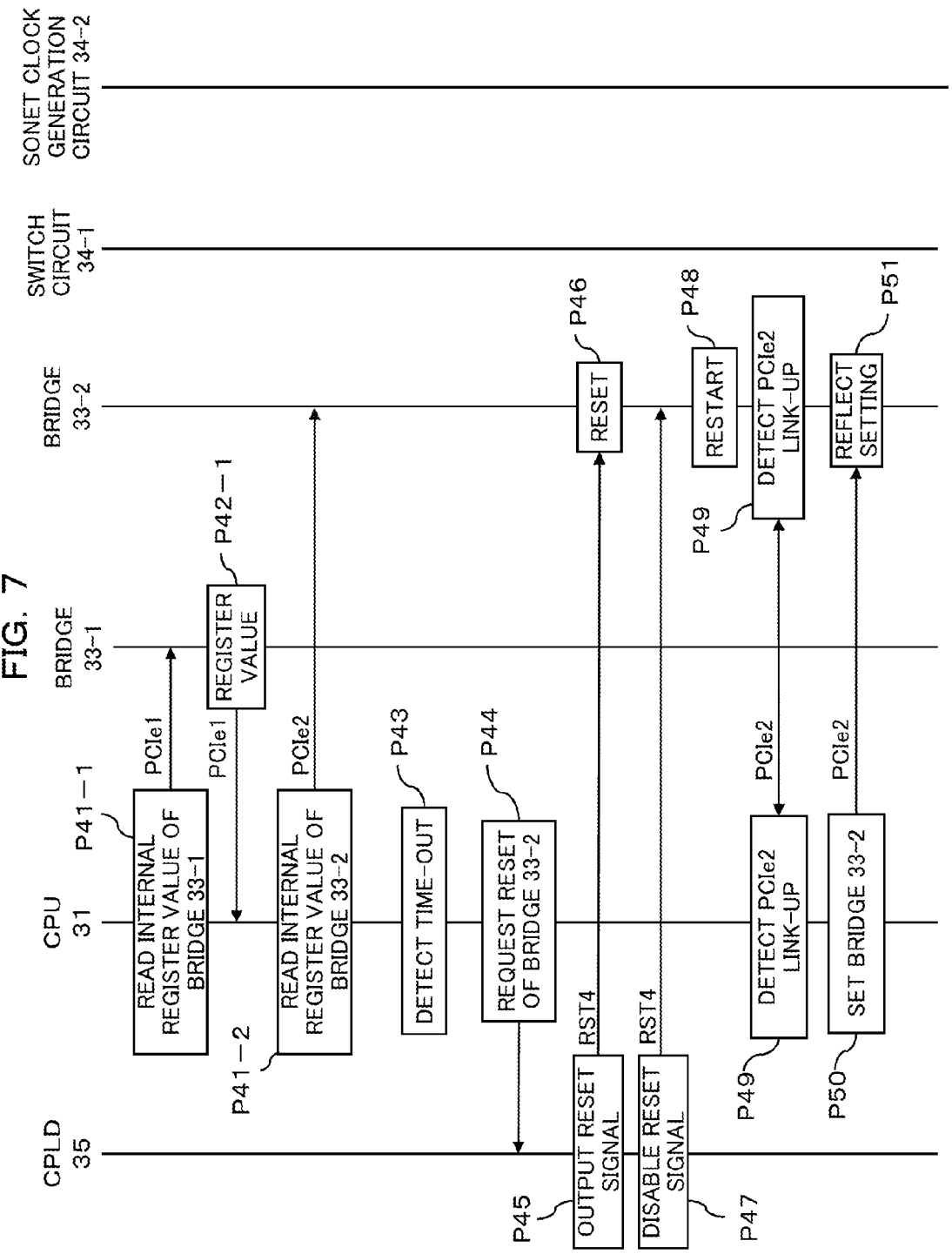

FIG. 7 illustrates an exemplary operation performed by the CPU 31 to acknowledge accesses to the bridges 33-1 and 33-2.

As illustrated in FIG. 7, the CPU 31 is operable to periodically read the register values from the internal registers of the bridges 33-1 and 33-2 through the PCIe buses PCIe1 and PCIe2 and to check whether the read register values coincide with expected values (Processes P41-1, P42-1, and P41-2).

As a result of the checking process, for example, it is assumed that a certain error occurs in the bridge 33-2 and that the CPU 31 does not receive a response to a request for reading the register value from the bridge 33-2 within a predetermined time. In this case, the CPU 31 detects time-out (Process P43).

In response to the detection of the time-out, the CPU 31 is operable to determine that an error has occurred in the bridge 33-2 and to transmit a reset request for the bridge 33-2 to the reset circuit 351 of the CPLD 35 (Process P44).

In response to a reception of the reset request for the bridge 33-2 from the CPU 31, the reset circuit 351 asserts (or outputs) a reset signal RST4 and then de-asserts (or disables) the reset signal RST4 to thereby restart the bridge 33-2 (Processes P45 to P48).

After a link-up of the PCIe bus PCIe2 is detected (Process P49), the CPU 31 transmits the setting information for the bridge 33-2 to the bridge 33-2 through the PCIe bus PCIe2 (Process P50). The bridge 33-2 stores and reflects the setting information received from the CPU 31 through the PCIe bus PCIe2 in the internal register (Process P51).

After the completion of the setting, the CPU 31 may periodically read the register values from the internal registers of the bridges 33-1 and 33-2 through the PCIe buses PCIe1 and PCIe2 again and may check whether the read register values coincide with expected values.

The process described above is applicable to a process in a case where an error occurs in the other bridge 33-1. For example, when the CPU 31 does not receive a response to the request for reading the register value from the bridge 33-1 within a predetermined time and detects time-out, the CPU 31 may transmit a reset request for the bridge 33-1 to the reset circuit 351.

Thereby, the reset circuit 351 may assert (or output) a reset signal RST3 (see FIG. 5) and then de-assert (or disables) the reset signal RST3 to thereby restart the bridge 33-1. Then, after a link-up of the PCIe bus PCIe1 is detected, the CPU 31 may transmit the setting information for the bridge 33-1 to the bridge 33-1 through the PCIe bus PCIe1, and the bridge 33-1 may store and reflect the received setting information in the internal register.

Figure 8:
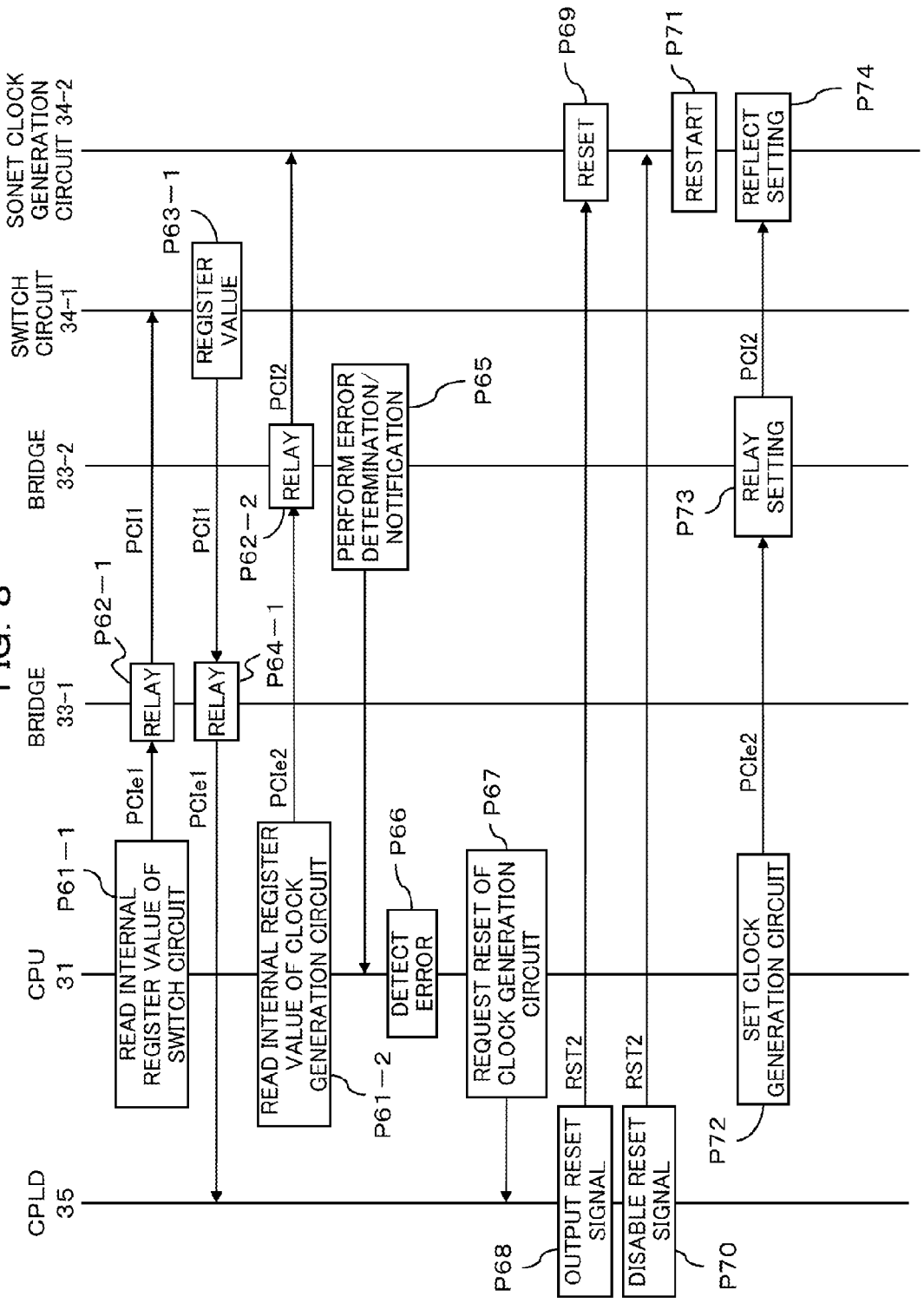

Next, FIG. 8 illustrates an exemplary operation performed by the CPU 31 to acknowledge accesses to the PCI devices 34-1 and 34-2 through the bridges 33-1 and 33-2.

As illustrated in FIG. 8, the CPU 31 is operable to periodically check whether or not expected register values can be read from the PCI devices 34-1 and 34-2 connected to the PCI buses PCI1 and PCI2 through the bridges 33-1 and 33-2.

For example, the CPU 31 is operable to transmit a register value reading request to the bridges 33-1 and 33-2 through the PCI buses PCIe1 and PCIe2 (Processes P61-1 and P61-2). In response to a reception of the reading request, the bridges 33-1 and 33-2 may transmit (or relay) the reading request to the PCI devices 34-1 and 34-2 through the PCI buses PCI1 and PCI2 (Processes P62-1 and P62-2).

In response to a reception of the reading request from the bridge 33-1 (and 33-2), the PCI device 34-1 (and 34-2) reads the values of the internal registers and responses to the CPU 31 through the bridges 33-1 and 33-2 as long as the PCI device 34-1 (and 34-2) is in normal state (Processes P63-1 and P64-1).

However, for example, it is assumed that an error occurs in the PCI device (the SONET clock generation circuit) 34-2 and that the bridge 33-2 does not receive a response of the register value within a predetermined time. In such a case, the bridge 33-2 may determine that an error has occurred in the PCI device 34-2 and may transmit an error notification to the CPU 31 through the PCIe bus PCIe2 (Process P65).

The CPU 31 is operable to detect an error in the PCI device 34-2 by receiving the error notification from the bridge 33-2 (Process P66). In response to the detection of the error, the CPU 31 is operable to request the reset circuit 351 of the CPLD 35 to reset the SONET clock generation circuit 34-2 (Process P67).

The reset circuit 351 asserts (or outputs) a reset signal RST2 and then de-asserts (or disables) the reset signal RST2 to thereby restart the SONET clock generation circuit 34-2 (Processes P68 to P71).

After the restart, the CPU 31 is operable to transmit the setting information for the SONET clock generation circuit 34-2 to the bridge 33-2 through the PCIe bus PCIe2 (Process P72). The bridge 33-2 is operable to transmit (or relay) the setting information received from the CPU 31 to the SONET clock generation circuit 34-2 through the PCI bus PCI2 (Process P73). The SONET clock generation circuit 34-2 stores and reflects the setting information received from the bridge 33-2 in the internal register (Process P74).

After the completion of the setting of the SONET clock generation circuit 34-2, the CPU 31 may periodically check whether or not the expected register values can be read from the PCI devices 34-1 and 34-2 through the bridges 33-1 and 33-2 again.

The process described above is applicable to a process in a case where an error has occurred in the switch circuit 34-1. For example, when the error notification is received from the bridge 33-1 as a response to the register value reading request, the CPU 31 may request the reset circuit 351 to reset the switch circuit 34-1.

Thereby, the reset circuit 351 asserts (or outputs) a reset signal RST1 (see FIG. 5) and then may de-assert (or disable) the reset signal RST1 to thereby restart the switch circuit 34-1 and perform the setting on the switch circuit 34-1.

Stack Prevention Process of PCI Bus

When the CPU 31 requests the reset circuit 351 to assert a reset signal RST0, the CPU 31 may stop (or limit) new communication using the PCI buses PCI1 and PCI2 and may wait for the completion of the communication already in progress in the PCI buses PCI1 and PCI2.

Figure 9:
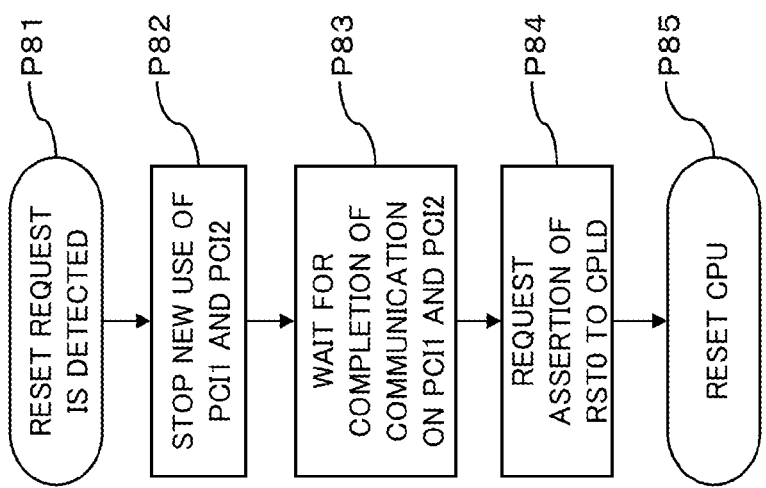
FIG. 9 is a flowchart that illustrates an exemplary operations of the processing card illustrated in FIG. 5.

FIG. 9 illustrates an exemplary operation thereof. As illustrated in FIG. 9, in response to a detection of an occurrence of a reset request (Process P81), the CPU 31 may stop new communication using the PCI buses PCI1 and PCI2 (Process P82). Then, the CPU 31, for example, may wait for an elapse of a predetermined time to wait for the completion of the communication already in progress in the PCI buses PCI1 and PCI2 (Process P83). Thereafter, the CPU 31 may request the reset circuit 351 to assert a reset signal RST0 (Process P84), and thereby, the CPU 31 is reset by the reset circuit 351 (Process P85).

Through the above process, it is possible to prevent the PCI bus PCI1 (and/or PCI2) from being stacked when the bridge 33 is restarted due to the restart of the CPU 31 during communication is already in progress using the PCI buses PCI1 and PCI2. Accordingly, it is possible to prevent the CPU 31 from not being able to communicate with the PCI device 34 after the restart of the CPU 31.

Although the configuration and the operation described above with reference to FIGS. 5 to 9 correspond to the configuration and the operation described with focusing on the apparatus monitor and control card 11B-5 illustrated in FIG. 4, the configuration and the operation described above with reference to FIGS. 5 to 9 may be applied to the other cards 11B-1 to 11B-4 illustrated in FIG. 4. Further, the configuration and the operation described above with reference to FIGS. 5 to 9 may be applied to any one of the cards 11A-1 to 11A-5 mounted in the Ethernet transmission apparatus 1A illustrated in FIG. 3. Such applicability is also applicable to modified examples described below.

Modified Examples

Figure 10:
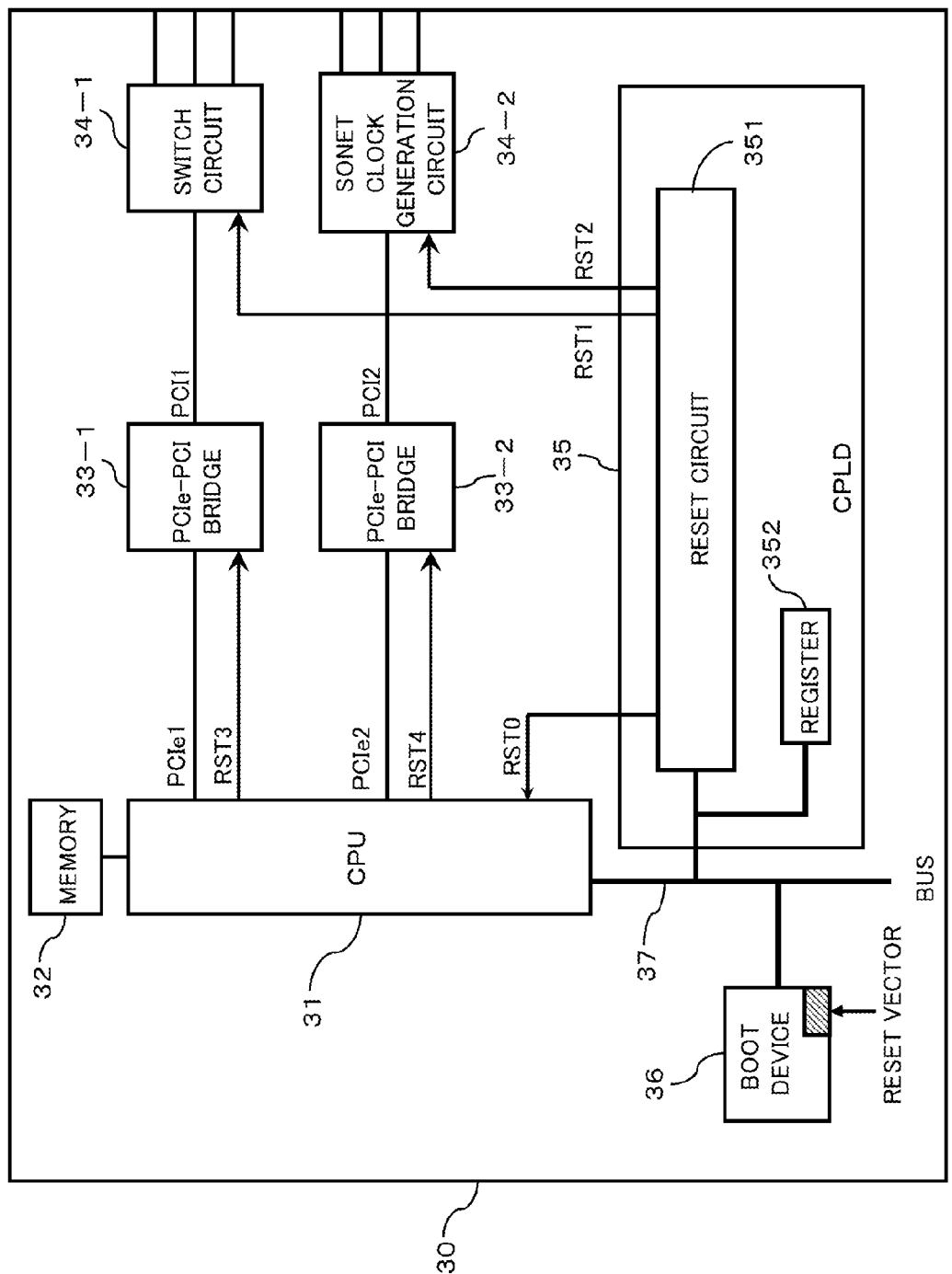
FIGS. 10 to 13 are block diagrams that illustrate modified examples of the processing card illustrated in FIG. 5.

FIGS. 10 to 13 are block diagrams that illustrate modified examples of the processing card 30 of the bridge configuration illustrated in FIG. 5. The processing card 30 illustrated in FIG. 10 is different from the configuration illustrated in FIG. 5 in that the reset signals RST3 and RST4 for the bridges 33-1 and 33-2 are output from the CPU 31 but not from the CPLD 35 (reset circuit 351). According to such a configuration, the operations and the advantages that are similar to those of the above-described embodiment can be achieved.

Figure 11:
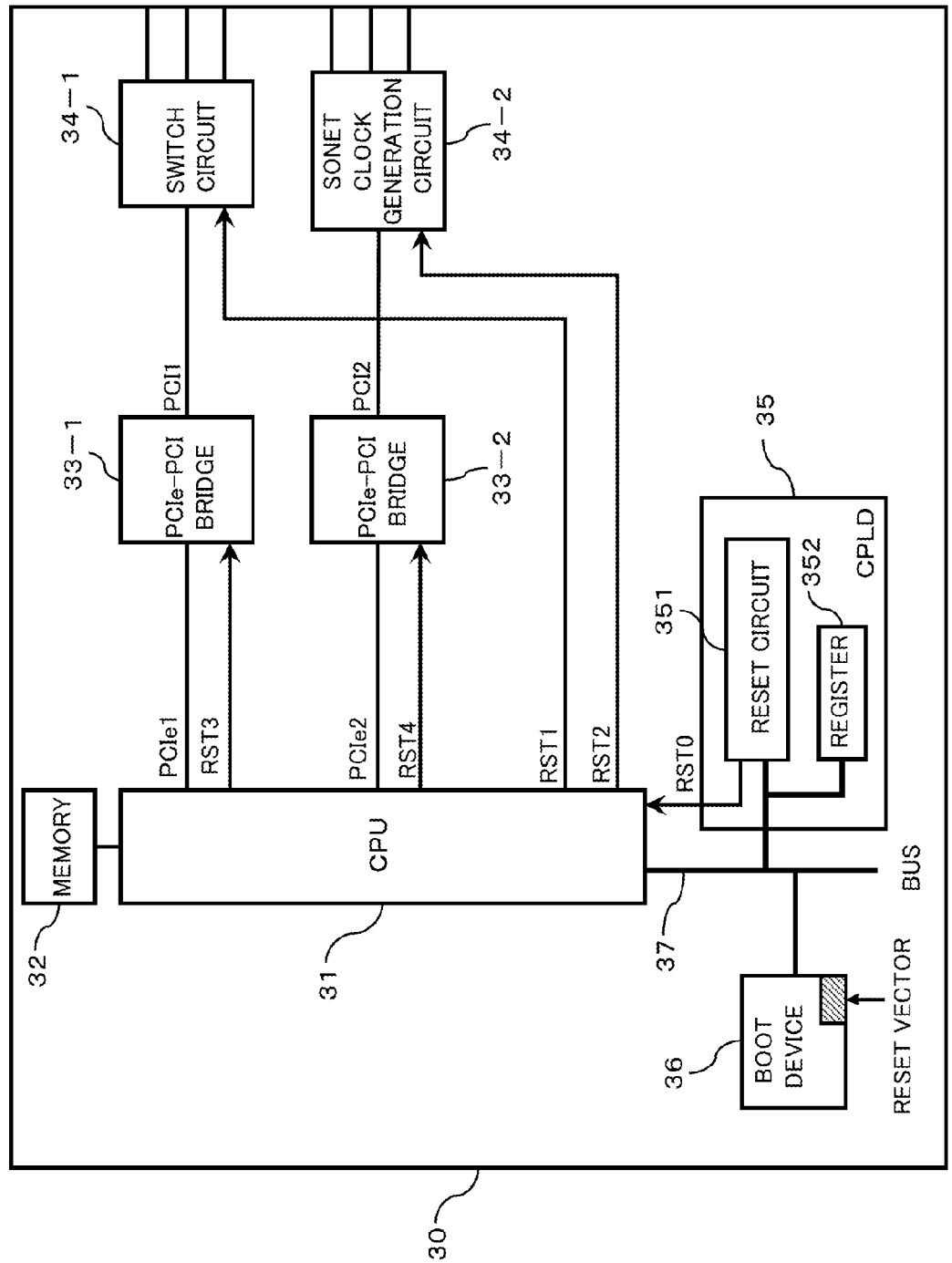

Meanwhile, the processing card 30 illustrated in FIG. 11 is different from the configuration illustrated in FIG. 10 in that the reset signals RST1 and RST2 for the PCI devices 34-1 and 34-2 are output from the CPU 31 in addition to the reset signals RST3 and RST4. In other words, among the five reset signals RST0 to RST4, only the reset signal RST0 for the CPU 31 may be given from the reset circuit 351 to the CPU 31. According to such a configuration, the operations and the advantages that are similar to those of the above-described embodiment can also be achieved.

Figure 12:
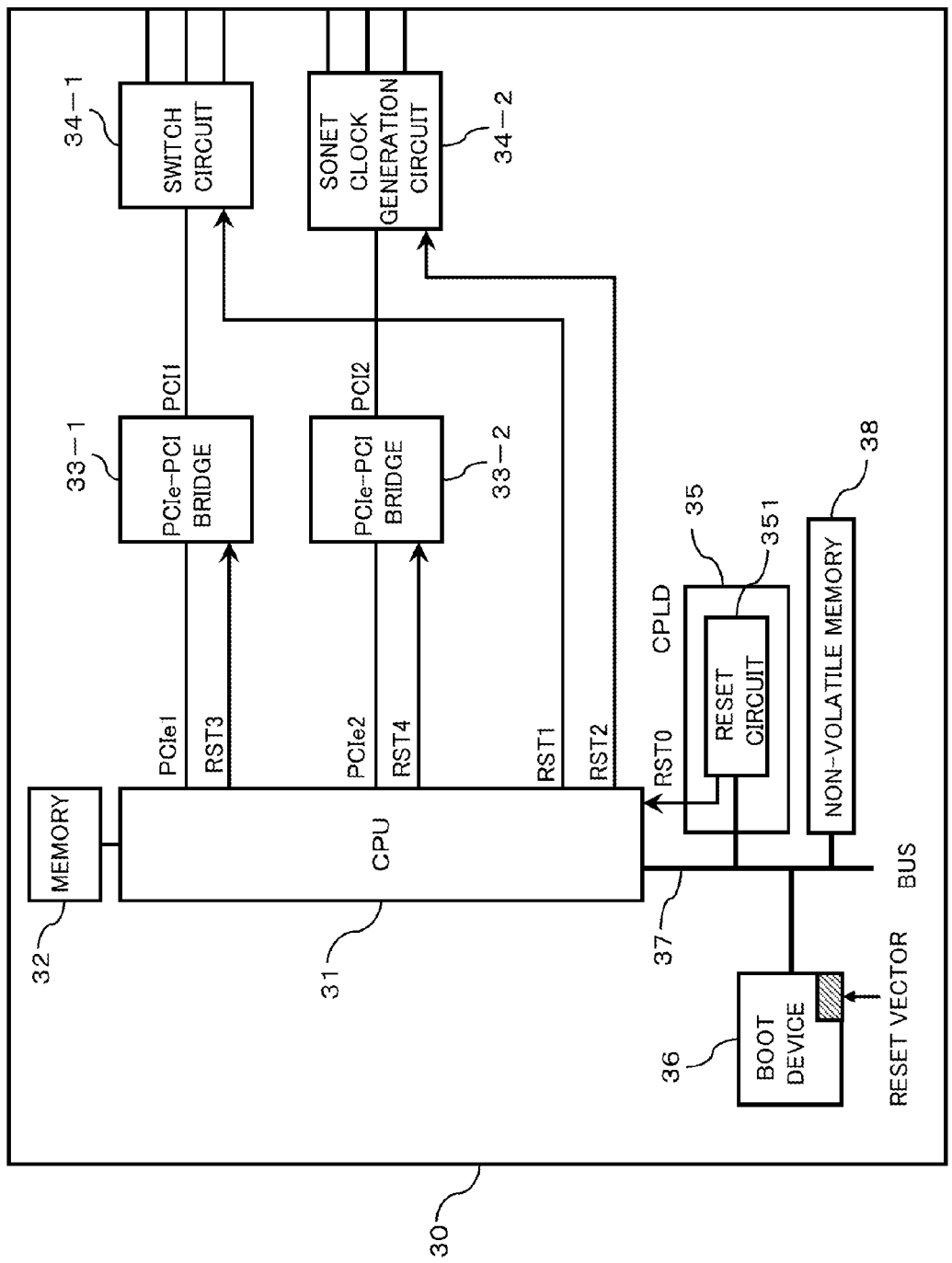

Further, as illustrated in FIG. 12, the register 352 of the CPLD 35 illustrated in FIG. 11 may be replaced with a non-volatile memory 38 that is connected to the bus 37. In other words, the information indicative of the operating state of the processing card 30 may be stored in a storage area in which information is maintained even when the CPU 31 is restarted, and the non-volatile memory 38 is an example of such a storage area.

Figure 13:
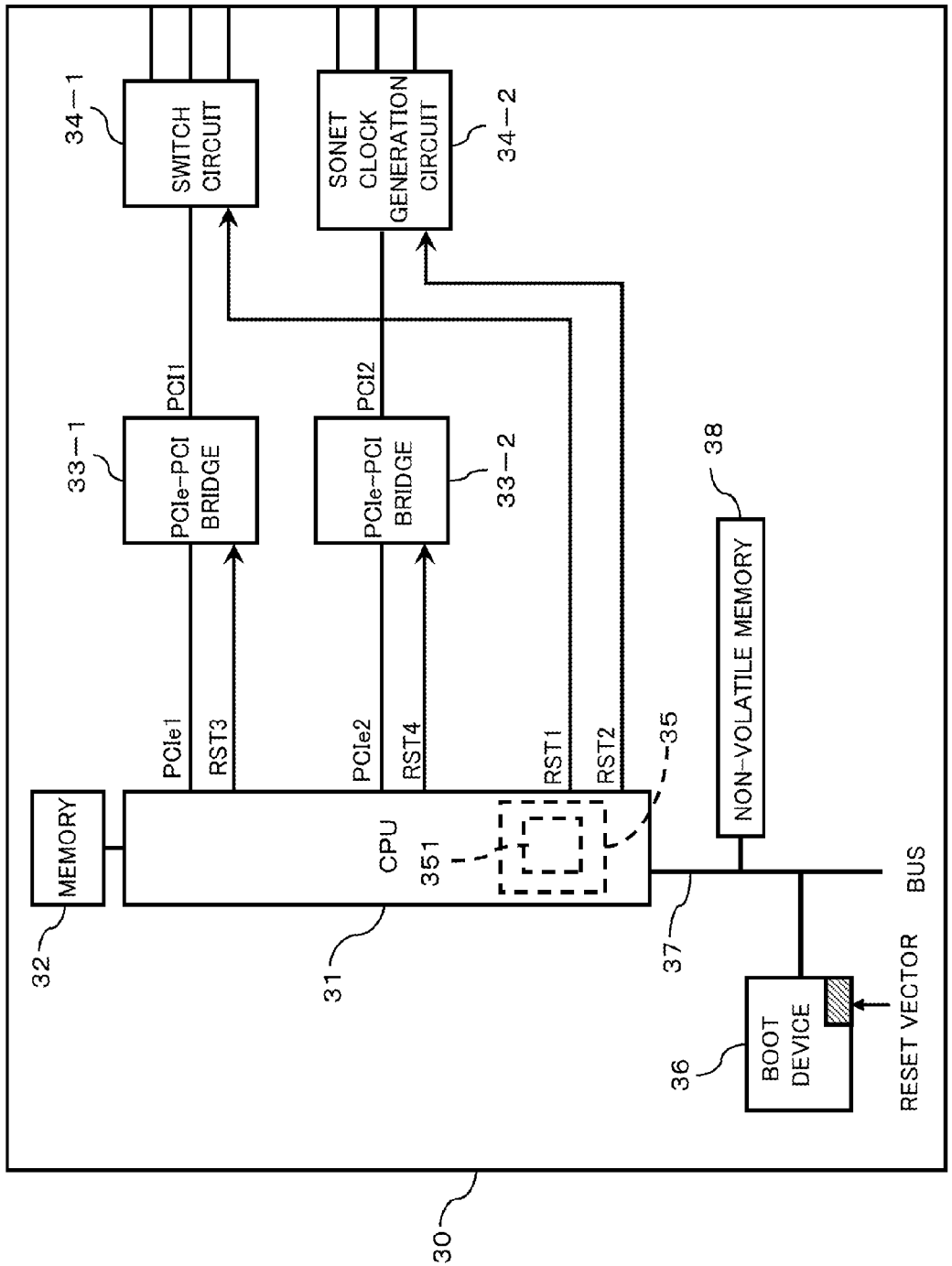

Furthermore, as illustrated in FIG. 13, the function of the CPLD 35 including the reset circuit 351 described above may be built in the CPU 31. In other words, the function of the CPLD 35 including the reset circuit 351 may be realized by software that is executed by the CPU 31. According to such a configuration, the operations and the advantages that are similar to those of the above-described embodiment can also be achieved.

As described above, according to the above-described examples, even when the CPU 31 is restarted, a reset signal is not input from the bridge 33 to the PCI device 34, and accordingly, there is no influence thereof on the process of the PCI device 34. Thus, there is no influence on the process of an interface card or the like performing signal processing according to the process of the PCI device 34.

Further, even when the CPU 31 is restarted after the processing card 30 is powered on, the PCI device 34 is not reset. Accordingly, the process performed by the PCI device 34 does not change before and after the restart of the CPU 31. Thus, signal processing and the like in the interface card can be continued normally.

According to the above-described technology, even when the processor is restarted, there is no influence on the operation of a device connected to the processor through the bridge, and the resetting of the device can be controlled.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A transmission apparatus comprising:
   a processing unit configured to process a transmission signal transmitted in a network; and
   a control unit configured to control the processing unit, wherein the control unit comprises:
   a processor;
   a bridge that is connected to the processor and is provided with a reset signal output terminal which outputs a reset signal in response to a detection of link-down between the bridge and the processor due to a restart of the processor;
   a device that is connected to the bridge and is unconnected to the reset signal output terminal of the bridge; and
   a controller configured to determine whether or not a reset for the processor is due to the restart of the processor, and to control a reset of the device according to a resultant of the determination.

2. The transmission apparatus according to claim 1, wherein
   the controller includes a storage unit configured to hold flag information indicating whether the reset for the processor is a first reset performed in response to a power-on reset of the control unit or a second reset performed in response to the restart of the processor after the control unit is powered on, and
   the controller performs setting of the device in response to a detection of the first reset indicated by the flag information and disables setting of the device in response to a detection of the second reset indicated by the flag information.

3. The transmission apparatus according to claim 1, wherein the processor requests the controller to reset the processor in response to an elapse of a predetermined time after new communication between the bridge and the device using a bus is stopped.

4. The transmission apparatus according to claim 1, wherein the device is a switch device configured to transmit routing information of the transmission signal to the processing unit.

5. The transmission apparatus according to claim 1, wherein the device is a clock generation device configured to supply a clock signal to the processing unit.

6. A control unit comprising:
   a processor;
   a bridge that is connected to the processor and is provided with a reset signal output terminal which outputs a reset signal in response to a detection of link-down between the bridge and the processor due to a restart of the processor;
   a device that is connected to the bridge and is unconnected to the reset signal output terminal of the bridge; and
   a controller configured to determine whether or not a reset for the processor is due to the restart of the processor, and to control a reset of the device according to a resultant of the determination.

7. The control unit according to claim 6, wherein
   the controller includes a storage unit configured to hold flag information indicating whether the reset for the processor is a first reset performed in response to a power-on reset of the control unit or a second reset performed in response to the restart of the processor after the control unit is powered on, and
   the controller performs setting of the device in response to a detection of the first reset indicated by the flag information and disables setting of the device in response to a detection of the second reset indicated by the flag information.

8. The control unit according to claim 6, wherein the processor requests the controller to reset the processor in response to an elapse of a predetermined time after new communication between the bridge and the device using a bus is stopped.

* * * * *